United States Patent [19]

Rowe

[11] 3,746,891

[45] July 17, 1973

[54] DIGITALLY CONTROLLED SINE WAVE GENERATOR

[75] Inventor: John J. Rowe, Bowie, Md.

[73] Assignee: The Singer Company, New York, N.Y.

[22] Filed: Dec. 27, 1971

[21] Appl. No.: 211,977

[52] U.S. Cl. ........................ 307/271, 328/15, 328/37

[51] Int. Cl. ............................................ H03k 1/16

[58] Field of Search .................. 328/59, 60, 61, 62, 328/37, 48, 142, 63, 14, 16; 307/271

[56] References Cited

UNITED STATES PATENTS

| | | | |
|---|---|---|---|
| 3,137,818 | 6/1964 | Clapper | 328/37 X |
| 3,500,213 | 3/1970 | Ameau | 328/142 X |
| 3,521,170 | 7/1970 | Leuthold et al. | 328/142 X |
| 3,605,026 | 9/1971 | Bowden | 328/63 |
| 3,657,658 | 4/1972 | Kubo | 328/61 |
| 3,660,766 | 5/1972 | Hilliard | 328/61 X |
| 3,093,796 | 6/1963 | Westerfield | 328/15 |
| 3,464,018 | 8/1969 | Cliff | 307/271 X |

*Primary Examiner*—John S. Heyman
*Attorney*—Francis J. Masselle

[57] ABSTRACT

Shown is a sine wave generator provide a highly stable output frequency which may be selected by an input signal from a digital computer. A crystal controlled oscillator provides its output to a digital counter, the output of which is compared with a register loaded by the computer. Each time the count equals the loaded value a flipflop is triggered and the counter reset causing the flipflop to provide a square wave output of a predetermined frequency. The square wave is then filtered by a digitally controlled filter to provide a final output which is a sine wave of the desired frequency.

8 Claims, 1 Drawing Figure

Patented July 17, 1973 3,746,891
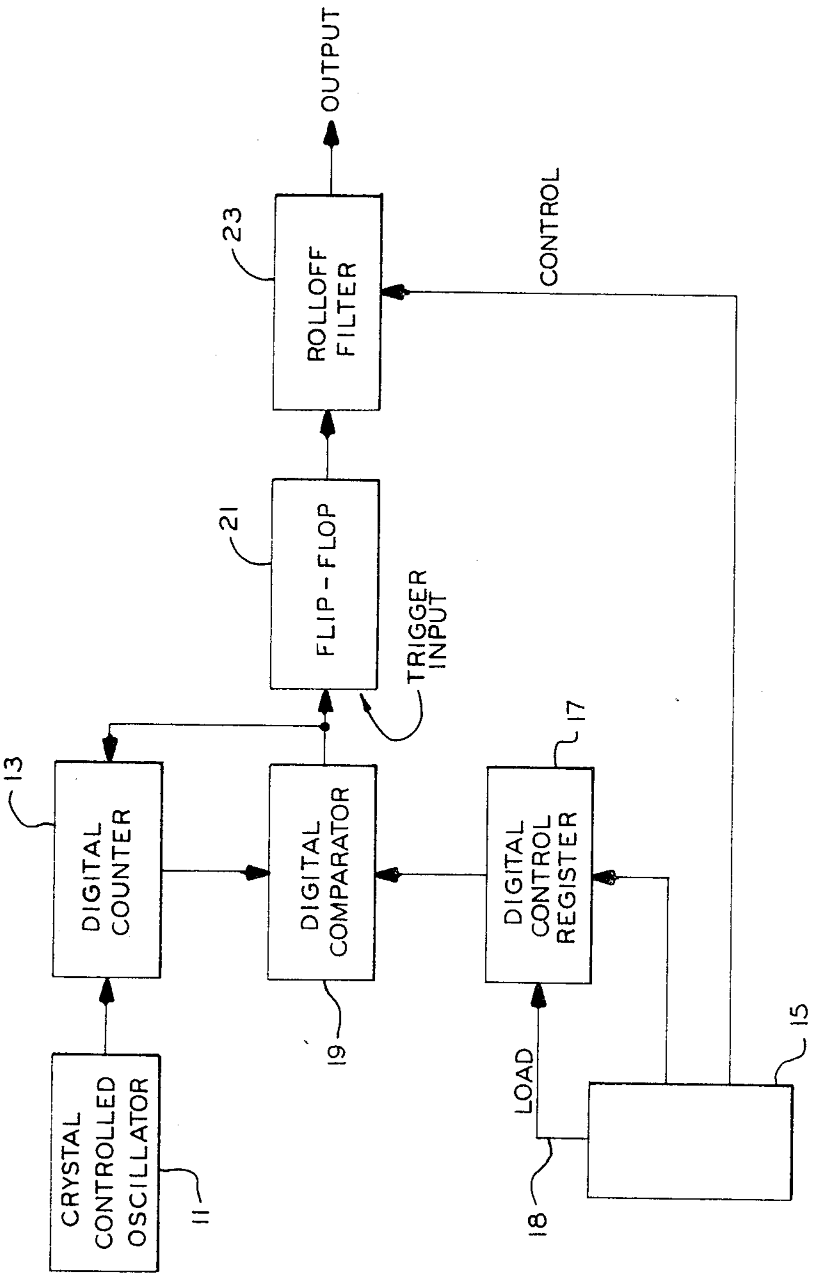
INVENTOR.
John J. Rowe
BY
John C. Altmiller
AGENT

DIGITALLY CONTROLLED SINE WAVE GENERATOR

This invention relates to oscillators in general and more particularly to a digitally controlled sine wave oscillator.

In various applications it is necessary to obtain a sine wave which may have any one of several selectable frequencies, each of which is highly stable. With the increased use of digital computers it is desirable to have such a device wherein the frequency may be selected by an output from a computer in response to appropriate programming therein.

It is well known that a crystal oscillator will provide an extremely stable output frequency. By using such an oscillator in combination with counting and comparison circuits and a digitally controlled filter, the present invention provides a stable sine wave output, the frequency of which may be changed in response to a digital command.

It is the principal object of this invention to provide a sine wave oscillator which produces a selected one of a plurality of stable sine wave outputs in response to a digital command.

It is also an object to provide such an oscillator which will respond to a command from a digital computer.

It is another object of this invention to provide a new electronic device which produces a highly stable oscillatory wave.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which the FIGURE is a block diagram of the preferred embodiment.

A crystal controlled oscillator 11 of a frequency twice the maximum desired output frequency provides an input to a digital counter 13. A digital command input in binary form is provided by block 15, which may be digital computer or set of switches, to a register 17 on initiation of a load command on line 18. The contents of the counter 13 and the register 17 are compared by a digital comparator 19 which will produce an output when the binary count in counter 13 equals the binary value stored in register 17. Counter 13, register 17 and comparator 19 may be micro circuits such as the Texas Instrument 7400 Series. This output from comparator 19 is provided to the trigger input of a flip-flop 21 and also is used to reset counter 13. The flip-flop output will be a square wave of the selected frequency as will be explained below. The square wave is filtered to obtain a sine wave by removing its harmonics in filter 23, a digitally controlled filter which may be constructed as described in U. S. Application Ser. No. 147,021 filed by H. H. Henegar on May 26, 1971 and assigned to the same assignee as the present invention. The digital input to the filter 23 will be provided in accordance with the above application by the control source 15.

The invention may be better understood by considering the frequencies at various parts of the circuit. If the frequency of oscillator 11 is designated $f_i$ then one oscillator cycle will have a period $t_i$. The count set into register 17 may be designated as $n$. Thus counter 13 will be reset (and comparator 19 will provide an output) every $n$ counts. The period of the output of comparator 19 ($t_c$) will be $t_c = t_i n$ and $f_c = 1/t_i n$. Flip flop 21 will complete one square wave cycle every two output pulses from comparator 19. (The first pulse will set it and the second reset it.) Thus the period of the output wave will be $t_o = 2t_c = 2t_i n$ and $f_o = 1/2t_i n$ or $f_o = f_i/2n$.

Since n must be at least one for a comparison to be made, the input frequency $f_i$ must be at least twice the maximum described output frequency.

For example, if $f_i$ were 240 Hz the following table would result.

| $f_o$ | $n$ |
|---|---|
| 120 | 1 |
| 60 | 2 |
| 40 | 3 |
| 30 | 4 |
| 24 | 5 |
| 20 | 6 |
| 17 | 7 |
| 15 | 8 |
| 13.33 | 9 |
| 12 | 10 |
| 10 | 12 |

An examination of the table indicates that the circuit provides good resolution for higher values of n and/or a wide range of frequencies between small and large values of n. Since all frequencies are derived by, in effect, dividing down a stable crystal oscillator frequency, they will also be stable.

Thus, a stable oscillator which will provide, in response to a digital command, any one of a plurality of output frequencies has been shown. It will be obvious to those skilled in the art that various modifications may be made without departing from the principles of the invention which is therefor intended to be limited only by the scope of the appended claims.

What is claimed is:

1. A stable sine wave generator comprising a stable accurate source of clock pulses, a counter, means for connecting the outupt of said source to the count input of said counter to cause said counter to count said clock pulses, a register, means for inserting into said register values representative of the period of the sine wave to be generated, a comparator, means for applying the contents of the register to one input of said comparator and for applying the changing contents of the counter to another input of said comparator, said comparator generating an output signal when it detects coincidence between its two inputs, a triggered square wave generator connected to the output from said comparator and responding to said signal as a trigger to generate a full square wave in response thereto, and means connected to the output of said square wave generator for converting said full square wave into a sine wave of the same frequency.

2. The invention according to claim 1 wherein said counter, said register and said comparator are binary devices.

3. The invention according to claim 2 wherein said binary devices comprise micro circuits.

4. The invention according to claim 2 wherein said means to insert values comprises a plurality of switches assigned binary values.

5. The invention according to claim 2 wherein said means to insert values comprises a digital computer.

6. The invention according to claim 1 wherein said square wave generator is a flip-flop.

7. The invention according to claim 1 wherein said means for converting comprises a digitally controlled filter connected to the output of said square wave generator and wherein said means to insert values further includes means to provide a binary signal to control said filter whereby the square wave output of said square wave generator after passing through said filter will be converted to substantially a sine wave.

8. The invention according to claim 7 wherein said oscillator is a crystal controlled oscillator source.

* * * * *